June 21, 1949.  J. J. MORRISON ET AL  2,473,965
SELF-SUPPORTING AERIAL ELECTRIC CONDUCTING CABLE
Filed Jan. 8, 1947
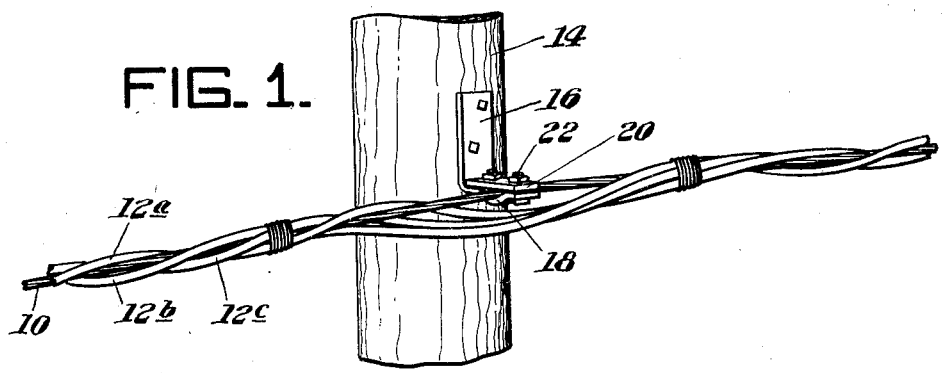
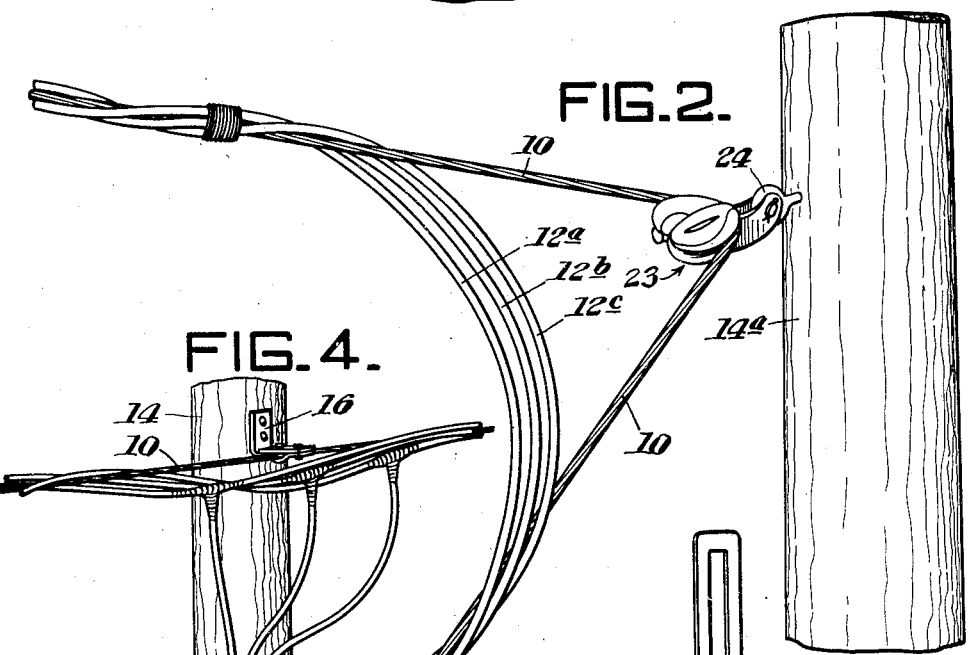
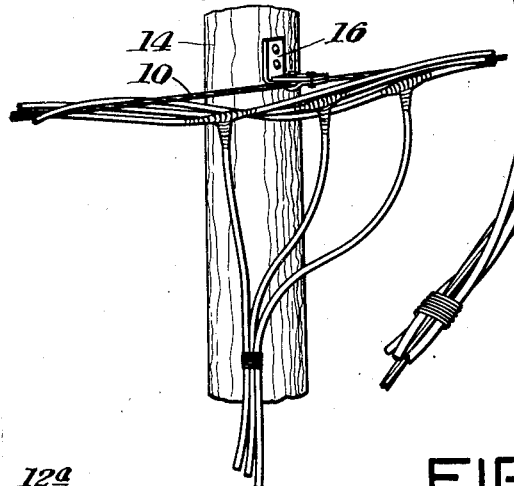
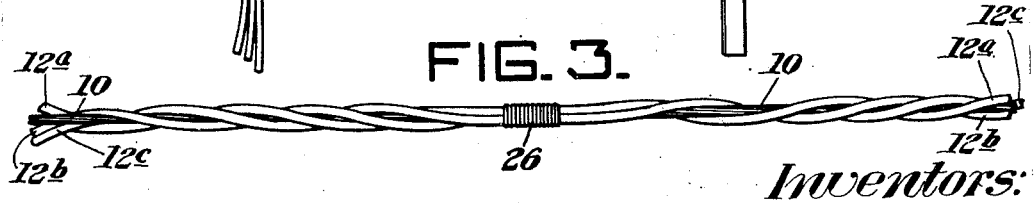
Inventors:
JAMES J. MORRISON and
ALFRED L. DUNA,
by: Donald G. Dalton
their Attorney.

Patented June 21, 1949

2,473,965

UNITED STATES PATENT OFFICE 2,473,965

SELF-SUPPORTING AERIAL ELECTRIC CONDUCTING CABLE

James J. Morrison and Alfred L. Duna, Worcester, Mass., assignors to The American Steel and Wire Company of New Jersey, a corporation of New Jersey Application January 8, 1947, Serial No. 720,772

5 Claims. (Cl. 174—70)

The present invention refers to improvements in electrical cables of the aerial self-supporting type, including a relatively high tensile strength messenger or supporting element and one or more insulated electrical conductors coiled thereabout.

One object of the invention is to provide an article of manufacture comprising a self-supporting cable including a relatively high tensile strength flexible tenuous supporting element with one or more insulated electrical conductors coiled thereabout in such manner as to facilitate the making taps to the insulated conductors. A further object is to provide a unitary article of manufacture comprising a pre-assembled cable comprising an elongated high tensile strength flexible tenuous supporting element with a plurality of insulated electrical conductors coiled thereabout in a helical fashion in such a way that there are respective helical portions of right and left hand lays surrounding the supporting element and including means binding or securing the insulated conductors to the supporting element at the regions where the directions of said lays change.

For a more complete disclosure of the invention which makes the above objects available reference should be made to the following detailed description, the accompanying drawings, and the appended claims.

In the drawings:

Figure 1 is a perspective view illustrating an aerial conducting cable of the present invention and one form of supporting means therefor.

Figure 2 is a perspective view illustrating the manner of supporting the improved cable with portions thereof disposed at an angle to one another.

Figure 3 is an elevation of the cable illustrating an embodiment wherein the insulated electrical conductors have respective helical portions of right and left hand lay surrounding the supporting element.

Figure 4 is a view illustrating the facility with which taps may be made in the cable of the present invention.

Figure 5 is a detail view of a clamp adapted to be used at points of lay change.

Referring first to Figure 1 in the drawings, 10 represents a relatively high tensile strength flexible tenuous supporting element such as the steel wire rope having a plurality of insulated conductors 12a, 12b, and 12c helically coiled thereabout. This embodiment of the invention represents a pre-assembled article of manufacture having the characteristics of simplicity of form, ease of installation, savings in cost and increased security of operation and service. The cable in Figure 1 is adapted for overhead installation on poles 14 equipped with suitable brackets 16 having depressed seat portions 18 to receive the flexible supporting element 10, the latter being held against displacement from the bracket by a keeper plate 20 secured by bolts 22 or other suitable fastening means.

The pitch or lay of the conductors 12a, 12b and 12c about the supporting element 10 is designedly intended to be extremely coarse so that access may be had to the three insulated electric conductors for the purpose of taking off taps merely by prying the conductors apart. This coarseness of pitch also facilitates the initial hanging cable as pictorially shown in Figure 1 where it is noted that the aerial conductors 12a, 12b and 12c have been pried apart so as to make room to accommodate the bracket 16.

While we are not limited to any particular pitch or lay of the conductors, the angle which the conductors make to the length of the supporting element or rope 10 should always exceed one degree.

One advantage of our improved cable is illustrated in Figure 2 where it is noted that the conductors 12a, 12b and 12c at the upper part of the figure are disposed at an acute angle to the same conductors as shown at the lower part of the figure and that the supporting element 10 at the upper part of the figure is disposed at an acute angle to the portion of the cable at the lower part of the figure, this supporting cable being shown as passing around a fitting 23 anchored to an eyebolt 24 secured to the supporting pole 14a.

We have determined in practice that in the installation of self-supporting aerial cables there is a tendency for the conductors 12a, 12b and 12c to tighten around the messenger or supporting element 10 under influence of the tensile strain due to initially pulling the cable in place when stringing it on the poles and to subsequent sagging. Also difficulty is encountered in securing slack for the making of taps and to a lesser degree in attaching the messenger or supporting element 10 to the poles. This condition is particularly prevalent in cables having more than one conductor due to the high percentage of circumferential coverage around the messenger or supporting element 10. To overcome this problem we have provided means for obtaining any desired amount of slack during installation and at any later time by providing a periodic reversal in the direction of lay of the conductors 12a, 12b and 12c around the conductor, as shown by way of example in Figure 3, in which case we provide tie members 26 at the region of lay reversal as shown in Figure 3. In this figure the portions of the conductors at the left side of the tie member 26 are shown as being of right hand lay whereas portions to the right side of the tie member 26 are shown as being of left hand lay. In other words, spaced parts of the conductors are oppositely coiled about the supporting element and are tied or clamped to the member 10 at the region of lay reversal. The spacing of the points of reversal of lay may be made of any convenient value, but we have determined that best results are secured by making a distance between reversals at intervals of approximately 20 feet. It is also deemed important to have at least two complete turns of each conductor around the supporting element 10 for each reversal interval. By maintaining at least two complete turns for each reversal interval, sufficient gripping action of the insulated conductors 12a, 12b and 12c on the messenger or supporting element 10 is secured so that the likelihood of slippage is prevented when the cables are installed on steep grades, such as occurs in transmission lines traversing hills or mountains. Likewise, making the reversal interval longer than 20 feet is objectionable in installation as it tends to locate the point of reversal or lay change too far from a pole for convenient handling. At the points of lay change in some instances we prefer, instead of the wire seizing 26 shown in Figure 3, to use metal strap such as shown in detail in Figure 5, commonly known as the "Davidson cable hanger" and conventionally used for attaching conductors to messengers in conventional cable installations since this type of strap serves as a simple, cheap and convenient clamp at the points of lay change.

In the installation of the cables herein shown and described any conventional means may be employed for pulling the pre-assembled cable into position since the clamps or seizing 26 at the points of lay change will readily pass through guide sheaves without movement from position or without blocking the sheave wheel. When extra slack in the conductors is desired either for easy attachment to pole hangers or other installation equipment or for the securing of slack to make taps to the insulated conductors, the clamp or tie member 26 at the nearest point of lay change is temporarily removed and the conductors 12a, 12b and 12c are rotated around a central supporting member 10 so as to unwind the conductors until the necessary amount of slack is obtained to accomplish the desired purpose. After the desired slack is secured sufficient, for example, to make the attachment of the cable to pole hangers, or for the making of taps, as shown in Figure 4, the conductors 12a, 12b and 12c may be rotated around the messenger 10 in reverse direction and the clamp or securing member 26 reapplied. A particular advantage of the invention is that in cases where excess slack is required for making so-called hot taps, that is, while current is still flowing in the conductors, ample clearance may be secured between the conductors to avoid short circuits and thus insure safety to the linemen so engaged in this work which would otherwise be quite hazardous.

While we have illustrated and described preferred embodiments of our invention the practicability of which has been demonstrated by an actual reduction of practice, it is to be understood that modifications and substitutions of equivalents may be made without departure from the invention as defined in the appended claims.

We claim:

1. An article of manufacture of the character herein shown and described comprising a relatively high tensile strength flexible tenuous supporting element, and an externally accessible, substantially co-extensive insulated electrical conductor having respective helical portions of right and left hand lay loosely surrounding said element and respective tie members binding said conductor to said element at the regions where the directions of said lays change.

2. An article of manufacture of the character herein shown and described comprising a steel messenger cable and an externally accessible, substantially co-extensive insulated conductor loosely coiled helically around and supported by the messenger cable and tie members encircling said conductor and said messenger cable to releasably bind the former to the latter.

3. An article of manufacture of the character herein shown and described comprising a steel messenger cable and an externally accessible, substantially co-extensive insulated conductor having respective helical portions of right and left hand lay loosely surrounding and supported by the messenger cable and respective tie members securing said conductor to the messenger cable at the regions where the directions of said lays change.

4. An article of manufacture of the character described comprising a high tensile strength wire rope having at least one externally accessible, substantially co-extensive insulated electrical conductor coiled loosely thereabout with spaced portions reversely laid at approximately 20 feet intervals and having tie members binding the conductor to the rope at the regions of the lay changes.

5. The article as defined in claim 4 further is characterized in that there are at least two complete turns of the conductor about the rope in the stretch thereof between the regions of lay reversal.

JAMES J. MORRISON.
ALFRED L. DUNA.

REFERENCES CITED

The following references are of record in the file of this patent:

UNITED STATES PATENTS

| Number | Name | Date |
| --- | --- | --- |
| 379,535 | Hewitt | Mar. 13, 1888 |
| 1,307,995 | Armor | June 24, 1919 |
| 2,430,378 | Waldron | Nov. 4, 1947 |

FOREIGN PATENTS

| Number | Country | Date |
| --- | --- | --- |
| 18,908 | Great Britain | Aug. 23, 1911 |
| 394,891 | Great Britain | July 6, 1933 |
| 327,871 | Germany | Oct. 18, 1920 |